US008174718B2

(12) United States Patent
Higuchi et al.

(10) Patent No.: US 8,174,718 B2
(45) Date of Patent: May 8, 2012

(54) FACSIMILE MACHINE AND CONTROL METHOD THEREOF

(75) Inventors: Takafumi Higuchi, Matsumoto (JP); Masayuki Matsumoto, Kitakyusyu (JP)

(73) Assignee: Seiko Epson Corporation, Tokyo (JP)

( * ) Notice: Subject to any disclaimer, the term of this patent is extended or adjusted under 35 U.S.C. 154(b) by 1029 days.

(21) Appl. No.: 12/152,629

(22) Filed: May 14, 2008

(65) Prior Publication Data

US 2008/0316543 A1    Dec. 25, 2008

(30) Foreign Application Priority Data

May 14, 2007    (JP) ................................. 2007-127796

(51) Int. Cl.
    *G06F 3/12*    (2006.01)
(52) U.S. Cl. ...... 358/1.15; 358/3.13; 358/400; 358/442; 358/443; 370/467; 379/93.17
(58) Field of Classification Search .................. 370/352, 370/465, 467; 375/219; 379/93.17, 100.13, 379/100.17; 709/207, 231, 246
    See application file for complete search history.

(56) References Cited

U.S. PATENT DOCUMENTS

| 5,818,870 A * | 10/1998 | Yaguchi ........................ 375/219 |
| 6,421,429 B1 * | 7/2002 | Merritt et al. ............... 379/93.17 |
| 2001/0039540 A1 * | 11/2001 | Hofmann et al. ................. 707/3 |
| 2003/0081234 A1 * | 5/2003 | Wiley ........................... 358/1.13 |
| 2004/0184110 A1 * | 9/2004 | Maei et al. ..................... 358/400 |
| 2004/0267953 A1 * | 12/2004 | Dunbar et al. ................ 709/231 |
| 2006/0291450 A1 * | 12/2006 | Ramachandran et al. .... 370/352 |
| 2007/0127082 A1 * | 6/2007 | Bae .............................. 358/400 |

FOREIGN PATENT DOCUMENTS

| JP | 2003-309701 A | 10/2003 |
| JP | 2004-187262 A | 7/2004 |
| JP | 2005-079929 A | 3/2005 |
| JP | 2005-340867 A | 12/2005 |
| JP | 2006-094024 A | 4/2006 |
| JP | 2006-157120 A | 6/2006 |

* cited by examiner

*Primary Examiner* — King Poon
*Assistant Examiner* — David S. Cammack
(74) *Attorney, Agent, or Firm* — Kilpatrick Townsend & Stockton LLP

(57) ABSTRACT

A facsimile machine includes an image data generating unit that reads a original and generates image data, an information transmitting and receiving unit that transmits and receive the digital data, a first data generating unit that generates first digital data used for a real-time communication method without using analog data, and a second data generating unit that generates second digital data used for a deemed voice communication method without using analog data.

when using the real-time communication method, the first data generating unit generates the first digital data and the information transmitting and receiving unit transmits the first digital data to the destination.

When using the deemed voice communication method, the second data generating unit generates the second digital data and the information transmitting and receiving unit transmits the second digital data to the destination.

6 Claims, 4 Drawing Sheets

FACSIMILE MACHINE AND CONTROL METHOD THEREOF

BACKGROUND

1. Technical Field

The present invention relates to a facsimile machine and control method thereof.

2. Related Art

A facsimile machine which may implement facsimile transmission/reception via a pubic telephone network (T.30 transmission) and facsimile transmission/reception via an IP network (T.38 transmission) has been proposed (see e.g., Patent Document 1). A machine described in Patent Document 1 (JP-A-2006-94024) generates analog data from digital data for the T.30 transmission using a fax modem to transmit it to a receiving party if the receiving party only supports transmission/reception over the pubic telephone network, and performs digital conversion using a codec, of the analog data generated from the digital data for T.30 transmission using the fax modem and transmits the digital data to the receiving transmitted party, if the receiving party supports transmission/reception over the IP network. The machine performs facsimile transmission in accordance with to the receiving party in this way.

However, in the machine described in Patent Document 1, data is converted into analog data using the fax modem also in the fax transmission/reception via the IP network, and the converted analog data is converted into digital data, which is transmitted/received via the IP network, thus the time required for transmission/reception cannot be reduced due to restrictions concerning the transmission speed of the analog data.

SUMMARY

An advantage of the invention is that it provides a facsimile machine capable of reducing the time required for transmission or reception and a control method thereof.

In order to attain the above-mentioned object, the present invention adopts the following means.

A facsimile machine of the present invention includes: image data generating unit that reads a original and generates image data which is digital data; an information transmitting and receiving unit that may transmit and receive the digital data; a first data generating unit that generates first digital data used for a real-time communication method executing data exchange in units of packets with a destination on the basis of image data generated by the image data generating unit, rather than by using analog data, a second data generating unit that generates second digital data used for a predetermined deemed voice communication method executing data exchange in units of packets with a destination based on the image data generated by the image data generating unit, rather than by using analog data; and a control unit that makes the first data generating unit generate the first digital data when information indicating that the destination communicates using the real-time communication method has been received by the information transmitting and receiving unit, and makes the information transmitting and receiving unit transmit the generated first digital data to the destination, while making the second data generating unit generate the second digital data when information that the destination communicates using the deemed voice communication method has been received by the information transmitting and receiving unit, and makes the information transmitting and receiving unit transmit the generated second digital data to the destination.

The present facsimile machine generates the first digital data used for the real-time communication method based on the image data generated by reading a original not through the analog data when the destination uses the real-time communication method, and transmits the generated first digital data to the destination, while generating the second digital data used for the deemed voice communication method on the basis of image data generated by reading a original, rather than by using analog data when the destination uses the deemed voice communication method, and transmits the generated second digital data to the destination. Generally, when transmitting data in the form of analog data, there are many restrictions concerning communication speed. In this case, as digital data is transmitted rather than analog data, the time required for transmission may be reduced more than in the case of a method of transmitting analog data to the destination.

The facsimile machine according to the present invention may be configured such that it includes a destination information input section through which information on a plurality of destinations may be input, wherein the control unit makes the first or second data generating section generate the first or second digital data according to the respective communication method of the input plural destinations, and makes the information transmitting and receiving section transmit the generated digital data to each of the input plural destinations in parallel when a concurrent transmission instruction indicating that the image data generated by the image data generating section should be transmitted to the plural destinations input through the destination information input section has been input through the destination information input section. Generally, when transmitting the read image data in the form of analog data when there are and the plural destinations, transmissions should be performed sequentially and when non-receipt of data occurs at any of the destinations, the transmission time to subsequent destinations may be delayed. Here, as digital data rather than analog data is transmitted to the destination, data transmissions may be executed in parallel, thus enabling the transmission of data to a plurality of destinations more rapidly.

The facsimile machine of the present invention may be configured such that the second data generating section performs digital-to-digital conversion of the first digital data so as to generate the second digital data, and the control unit makes the first data generating unit generate the first digital data and makes the second data generating unit generate the second digital data from the generated first digital data where the information transmitting and receiving unit has received information indicating that the destination uses the deemed voice communication method. Thereby, data transmission using a real-time communication method using fewer restrictions concerning the transmission speed than the deemed voice communication method may be preferably used, thus reducing the time required for transmission.

The facsimile machine of the present inventions may be configured such that the first data generating section may generate the image data from the first digital data rather than from analog data, and the second data generating section may generate the image data from the second digital data rather than from analog data, and the control unit makes the first digital generating unit generate the image data from the received first digital data, where the information transmitting and receiving unit has received the first digital data from the transmission origin, while making the second data generating unit generate the image data from the received second digital data, where the information transmitting and receiving unit has received the second digital data from the transmission origin. Thereby, as the received data which is converted to the image data is not analog data that has many restrictions concerning reception speed, the time required for a transmission may be reduced more than that in case of a unit that converts received analog data to image data.

The facsimile machine of the present invention may be configured such that the second data generating section performs digital-to-digital conversion of the second digital data to be able to generate the first digital data, and the control unit makes the second data generating unit generate the first digital data from the received second digital data, and makes the first data generating unit generate the image data from the generated first digital data, where the second digital data has been received from the transmission origin. Thereby, the data transmission using the real-time communication method with fewer restrictions concerning the reception speed than in the case of the deemed voice communication method may be principally involved, thus reducing the time required for reception.

A control method of a facsimile machine according to the present invention having a first data generating section that generates first digital data used for the real-time communication method of executing data exchange with a destination in units of packets, on the basis of image data which is digital data generated by reading a original, rather than by using analog data, and a second data generating section that generates second digital data used for the deemed voice communication method of executing data exchange with a destination in units of packets, on the basis of image data generated by reading a original, rather than by using analog data includes:

(a) making the first data generating section generate the first digital data and transmitting the generated first digital data to the destination where the destination uses the real-time communication method; and
(b) making the second data generating section generate the second digital data and transmitting the generated second digital data to the destination where the destination uses the deemed voice communication method.

In the control method of the present facsimile method, the first digital data used for the real-time communication method is generated on the basis of the image data generated by reading the original, rather than by using analog data and the generated first digital data is transmitted to the destination, where the destination uses the real-time communication method, while the second digital data used for the deemed voice communication method is generated on the basis of the image data generated by reading the original, rather than by using analog data and the generated second digital data is transmitted to the destination, where the destination uses the deemed voice communication method. Generally, when transmitting analog data, there are many restrictions concerning communication speed. In this case, as digital data is transmitted and received rather than analog data, the time required for the transmission may be reduced more than in a case of a method of transmitting analog data to the destination. In addition, in the control method of the facsimile machine, various embodiments of the above-mentioned facsimile machine may be adopted, alternatively, steps of realizing each function of the above-mentioned facsimile machine may be added.

A program of the present invention causes one or more computers to realize each step of the above-mentioned control method of the facsimile machine. This program may be stored in a computer readable recording medium (e.g., a hard disk, ROM, FD, CD, or DVD) or alternatively may be distributed from one computer to another via a transmission medium, i.e., a communication network such as the Internet, or may be given and received in any other form. By causing a computer to execute this program, or causing a plurality of computers to execute different steps of the program, each step of the above-mentioned control method of the facsimile machine may be executed, thus a working-effect similar to that of the control method may be obtained.

BRIEF DESCRIPTION OF THE DRAWINGS

The invention will be described with reference to the accompanying drawings, wherein like numbers reference like elements.

FIG. 3 is an explanatory drawing of the display for setting the fax destination 80 displayed on the display portion 28a.

FIG. 4 is an explanatory drawing of the fax data management information 24a.

DESCRIPTION OF EXEMPLARY EMBODIMENTS

Figure 1:
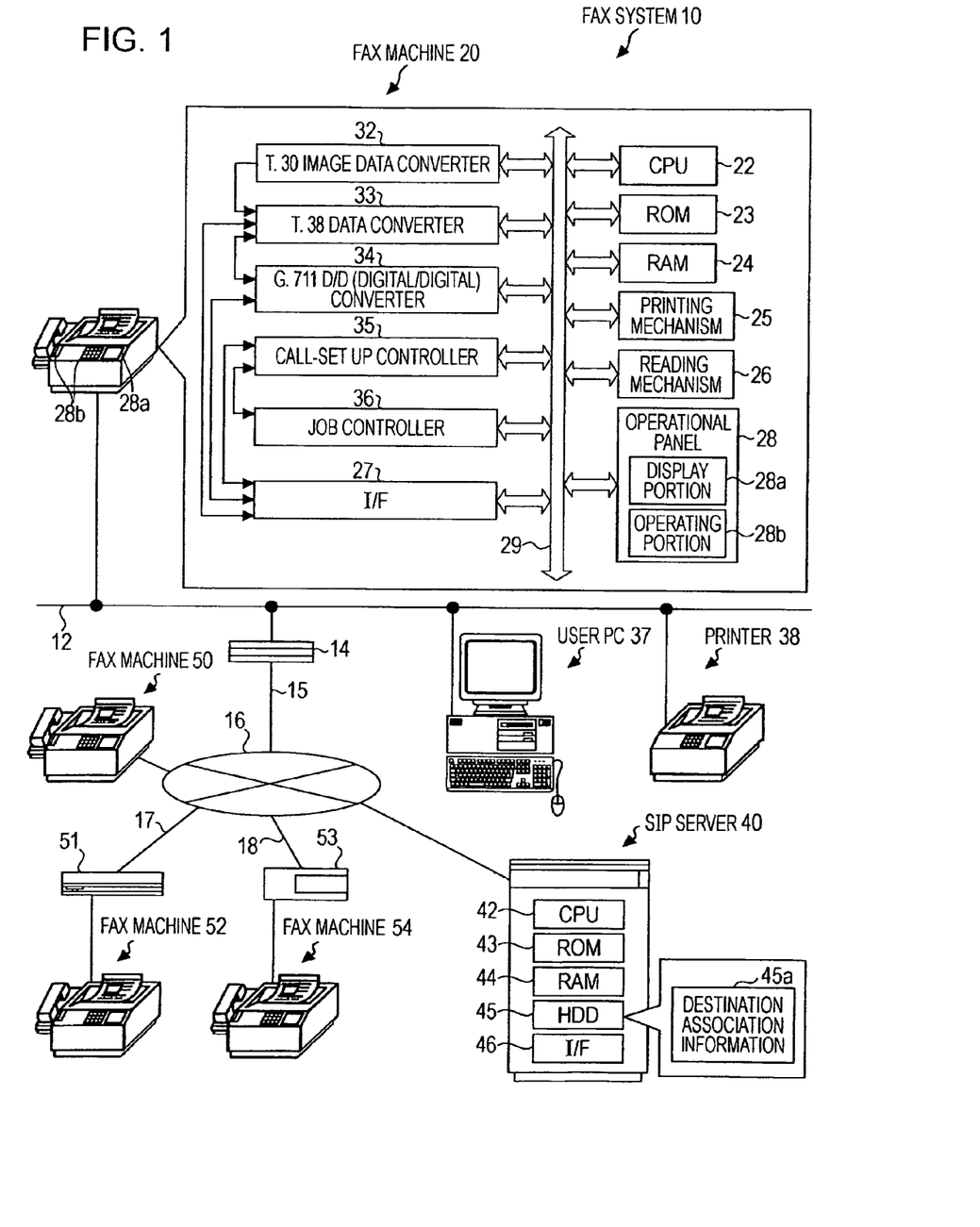
FIG. 1 shows a configuration drawing illustrating an overview of the configuration of a facsimile system 10.

Subsequently, the preferred embodiment of the present invention will be described with reference to the accompanying drawings. FIG. 1 is a configuration drawing illustrating an overview of the configuration of a facsimile system 10, one embodiment of the present invention. The fax system 10 of the present embodiment is composed of a fax machine 20 connected to a LAN 12, transmitting and receiving fax data over the Internet 16, an SIP (Session Initiation Protocol) server 40 as an information management device connected to the Internet 16, managing the destination of the FAX data, and FAX machines 50, 52, 54 connected to the Internet 16. A user's personal computer (PC) 37, another user's PC (not shown), a printer 38, other printers (not shown) and the like are connected to the LAN 12.

The fax machine 20 includes a CPU 22 executing various control operations, a ROM 23 storing various processing programs, a RAM 24 temporarily storing data, a printing mechanism 25 printing an image on paper, a reading mechanism 26 reading an image on the paper, a network interface (I/F) 27 capable of transmitting and receiving a signal with an external device connected to the LAN 12, and an operation panel 28 through which a user inputs various instructions. The CPU 22 is connected to the printing mechanism 25, a reading mechanism 26 and the like such that information may be exchanged via a bus 29. The RAM 24 is provided with a plurality of regions including a printing buffer temporarily storing image data to be printed by the printing mechanism 25, a scanner buffer temporarily storing the image data read by the reading mechanism 26, and a communication buffer that temporarily stores the digital data used for a fax transmission (hereinafter referred to as "fax data"). The printing mechanism 25 is configured as a full-color electrophotographic-type printer adopting a single-photoconductor method and an intermediate transfer method, which develops electrostatic latent images of 4 colors of (C) cyan, (M) magenta, (Y) yellow, and (K) black into toner images and transcribes them on paper by heat-deposition. The reading mechanism 26 is configured as a flatbed-type scanner that reads the original by scanning with a so-called line image sensor generating digital scan data (image data) by separating light reflected after irradiating light onto the paper which is a original placed on a glass surface into (R) red, (G) green, and (B) blue components using the line image sensor. An operation panel 28 is a device through which a user inputs various instructions to the fax machine 20 and is provided with a display portion 28a which is an LCD display on which letters, graphics, and symbols according to various instructions are displayed, and an operating portion 28b comprising a cursor key by which a cursor displayed on the displaying portion 28a is moved, a decision key through which an input instruction is confirmed, a numerical keypad by which a fax number is input and the like. The I/F 27 is connected to a router 14 via the LAN 12, which is connectable to the Internet 16 via an optical network 15 to which the router 14 is connected.

Further, in order to realize a transmission/reception function of the fax data, the FAX machine 20 includes a T.30 image data converter 32 that converts digital scan data generated by the reading mechanism 26 and digital data using the T.30 method (hereinafter referred to as "T.30 data") which is the FAX data of ITU-T Recommendation each other, a T.38 data converter 33 as a Codec that converts the T.30 data and digital data using the T.38 communication method of ITU-T Recommendation (hereinafter referred to as "T.38 data"), a G.711 D/D (digital/digital) converter 34 as a Codec that converts the T.38 data and digital data using the G.711 encoding method of ITU-T Recommendation (hereinafter referred to as "G.711 data"), a call set-up controller 35 that generates a SIP packet for a call control, performs information exchange with an SIP server 40 and makes a connection with the other party of communication, a job controller 36 that controls information associating the scan data with the destination based on a user's transmission instruction. The T.38 data converter 33 converts the scan data to the T.38 data and the T.38 data to the image data, functions as a T.38 gateway exchanging the digital data with the other party of communication using the real-time communication method. The G.711 D/D converter 34 converts the T.38 data to the G.711 data and the G.711 data to the T.38 data and functions as a VoIP gateway exchanging the digital data with the other party of communication according to the deemed voice communication method. The G.711 D/D converter 34 is provided with a conversion table that associates the T.30 data included in the T.38 data with T.30 data included in the G.711 data. In the present Fax machine 20, a user operates the operating portion 28b to input the instruction to transmit, the reading mechanism 26 then generates the scan data, the call set-up controller 35 performs a connection process to connect with the destination together with obtaining information on the destination, and the T.30 image data converter 32 generates the T.30 data, generates the T.38 data or the G.711 data through the T.38 data from the T.30 data according to the communication method of the destination, and transmits and outputs the generated data from the I/F 27 in a packet unit to the destination. In this way, the Fax machine 20 generates digital data rather than analog data for communication.

The SIP server 40 having a function as a telephone number control server, which is a server that makes communication connection between terminals connected to the Internet 16 directly or connected thereto via the LAN 12, is provided with a CPU 42 that performs various control operations, a ROM 43 that stores various control programs, a RAM 44 that temporarily stores data, an HDD 45, which is a large memory that stores various application programs and various data files, and an I/F 46 that may transmit and receive a signal with the external device connected to the LAN 12. The CPU 42 is connected to the HDD 45 and the I/F 46 and the like such that it may exchange information via a bus (not shown). The SIP server 40 uses a receive buffer and a transmit buffer provided in the predetermined region of the RAM 44, when transmitting/receiving data to/from the Fax machines 20, 50, 52, 54 and the like via the Internet 16. The HDD 45 stores destination association information 45a indicating an association of information on a telephone number (Fax number), an address of a terminal, and a function of the terminal (e.g., an available communication method). The SIP 40 server uses the destination association information 45a, exchanges information with an other SIP server (not shown) or the like, and specifies the address of the destination (e.g., a Fax machine 50) as well as connecting the transmission origin (e.g., the Fax machine 20) to the destination.

The Fax machine 50 is configured as a T.38 Fax machine that performs a transmission/reception of the fax data in real-time according to the T.38 communication method. The fax machine 50 is connected to the Internet 16 via a network interface (I/F) (not shown). The fax machine 52 is configured as a fax machine supporting G3, having a fax modem. The fax machine 52 is connected to the T.38 gateway 51, and connectable to the Internet 16 via an optical line 17 to which the T.38 gateway 51 is connected. The fax machine 54 is configured as a fax machine supporting G3, having a fax modem. The fax machine 54 is connected to the VoIP gateway 53, and is connectable to the Internet 16 via an IP line 18 such ADSL to which the VoIP gateway 53 is connected. In addition, as the configurations of the CPU, ROM, and RAM as a controller, the printing mechanism, and a reading mechanism of the fax machines 50, 52, 54 are identical to those of the fax machine 20, explanation thereof is omitted.

Figure 2:
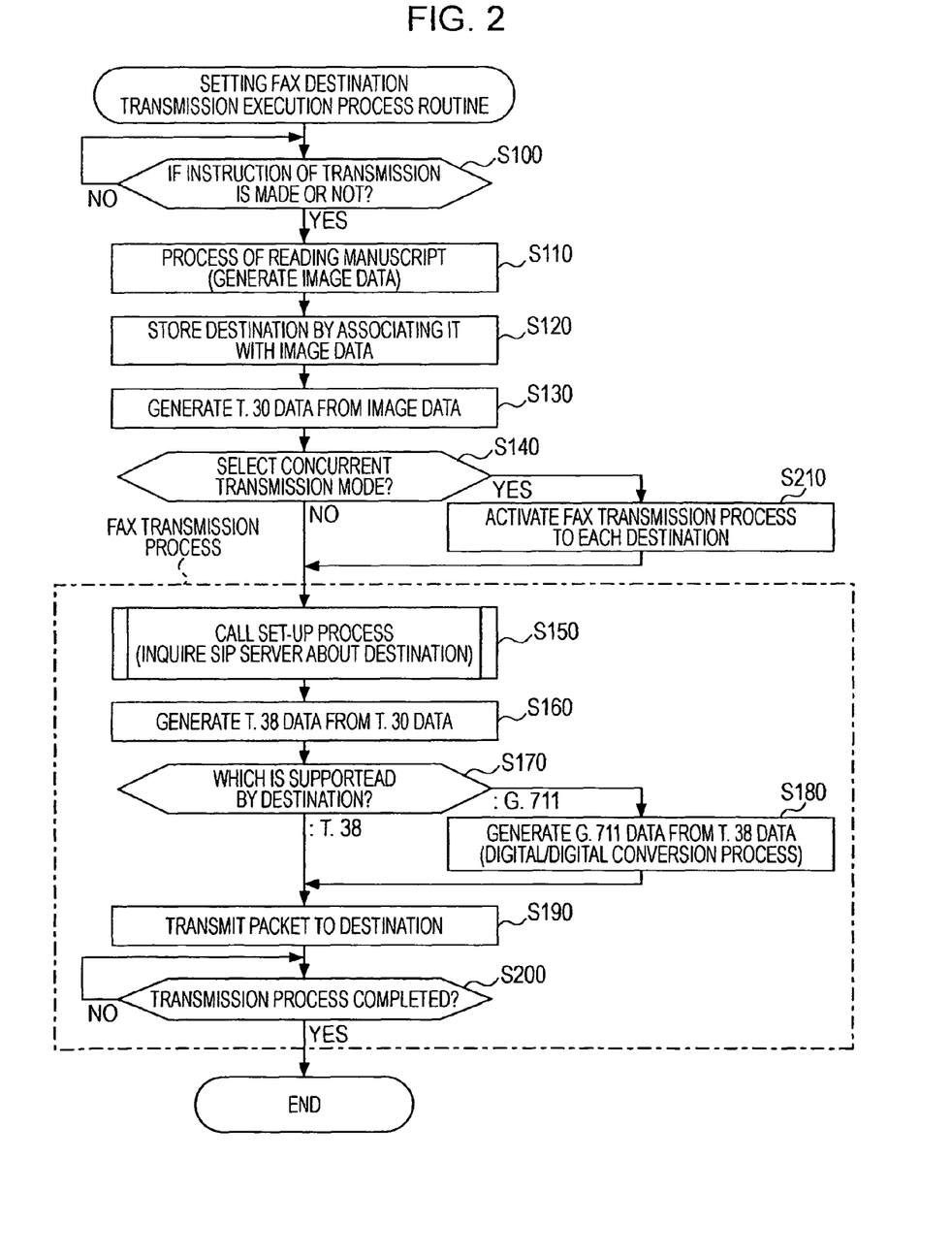
FIG. 2 shows a flow chart showing a process routine of setting a fax destination and performing transmission.
Figure 3:
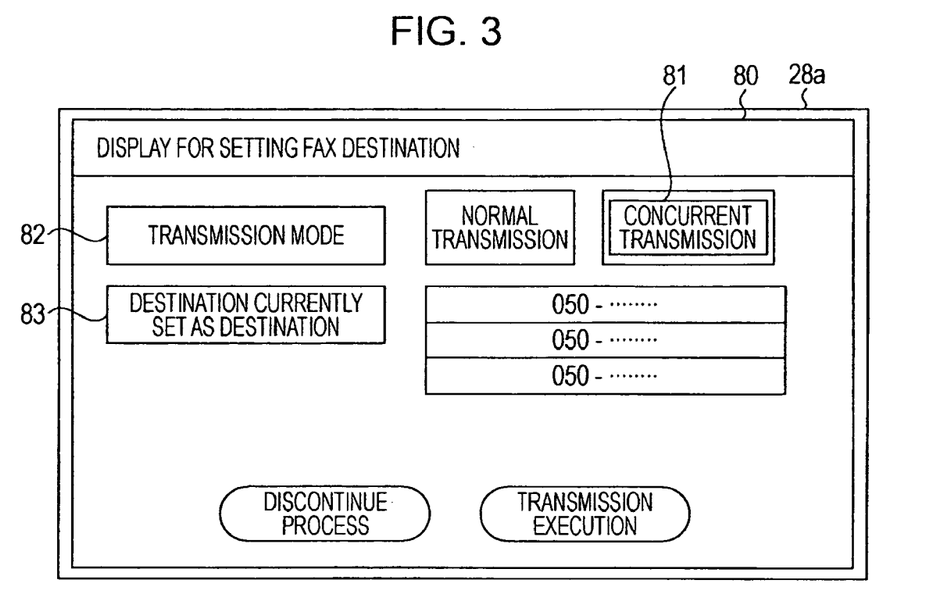

Next, as to an operation of the fax machine 10 of the present embodiment configured in this way, an operation performed by a user for transmitting fax data will be explained first. FIG. 2 shows a flow chart showing an example of a process routine of setting a fax destination and performing transmission performed by the CPU 22 of the fax machine 20. This routine is stored in the ROM 23 and repeated after the fax machine 20 starts to operate. If this routine is executed, the CPU 22 firstly determines whether an instruction to transmit the fax data is made or not (step S100), an instruction to transmit the fax data is not made. The fax machine is configured such that determination of the instruction to transmit is made based on whether a transmission execution button has been pressed or not on a display for setting the fax destination 80 displayed on the display portion 28a. FIG. 3 is an explanatory drawing of the display for setting the fax destination 80 displayed on the display portion 28a. The display for setting the fax destination 80 includes a cursor 81 by which a setting item may be selected, a transmission mode input section 82 by which a normal transmission having one destination as a setting item or a concurrent transmission by which the same data is transmitted to a plurality of destinations may be set, a destination display portion 83 displaying a fax number that is currently set as the destination and the like. A user operates the operating portion 28b to input necessary information into the display for setting the fax destination 80. If the information is input, the CPU 22 then stores the contents thereof in the RAM 24.

Figure 4:
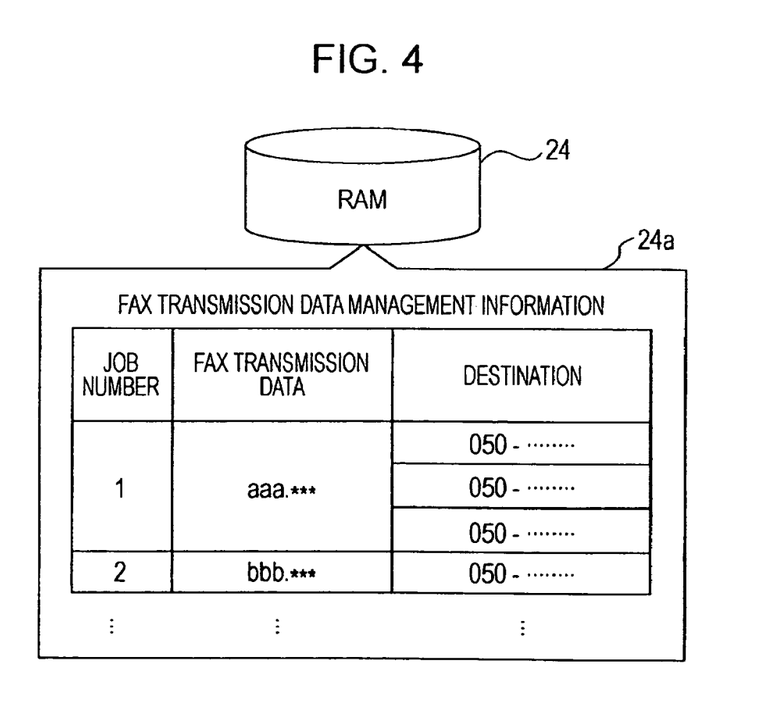

If it is determined that the instruction to transmit the fax data has been made in step S100, the CPU 22 activates and controls the reading mechanism 26 to perform a process of reading a original, and generate the image data which is digital data (step S110). A reading process in which the reading mechanism 26 irradiates light onto the original and the line image sensor reads the light reflected from the original and outputs an analog signal, from which the scan data as the digital image data is generated, is executed. Here, the fax machine is configured such that TIFF data is generated as the image data. Next, the CPU 22 associates the destination with the image data to make the job controller 36 store fax data management information 24a therein (step S120). FIG. 4 is an explanatory drawing of the fax data management information 24a. The fax data management information 24a includes job numbers indicating an order that the fax transmission instruction was made, fax data, and fax numbers as destinations of the fax data. As for a job whose transmission mode is set as a normal transmission, fax data is associated with one destination, and as for a job whose transmission mode is set as that of concurrent transmission, fax data is associated with a plurality of fax numbers. Next, the CPU 22 makes the T.30 image data converter 32 generate the T.30 data from the read image data (step S130).

Next, the CPU 22 determines whether concurrent transmission is selected or not based on information stored in the RAM 24 that was input into the display for setting the fax destination 80 (step S140), and performs a fax transmission processes in steps S150 to S200 if the concurrent transmission is not selected, namely, normal transmission is selected. Firstly the CPU 22 makes the call set-up controller 35 perform the call set-up process (step S150). Here, the call set-up process, of transmitting the SIP packet to an address of the SIP server 40 stored in the call set-up controller 35, and receiving information on the address corresponding to the fax number of the destination and on the performance of the fax machine of the destination, e.g., an available communication method is executed at an appropriate communication speed, and a call set-up is made in order to enable to communicate with the destination. Subsequently, the CPU 22 makes the T.38 data converter 33 generate the T.38 data from the T.30 data (step S160). Here, the T.38 data converter 33 generates T.38 data, rather than analog data, so that it becomes a format of an IFP packet including the T.30 data.

Subsequently, the CPU 22 determines whether a communication method which the destination supports is a real-time communication method using the T.38 data or a deemed voice communication method using the G.711 data (step S170). If the communication method which the destination supports is a deemed voice communication method, the CPU 22 makes the G.711 D/D converter 34 perform a conversion of the T.38 data to the G.711 data (step S180). Here, the fax machine is configured such that the G.711 D/D converter 34 stores a conversion table that associates the T.38 data with the G.711 data in each modulation method of modulating from the T.30 data to an analog signal using the fax modem, and if the modulation method which the fax modem of the destination supports is given, reads the conversion table corresponding to the modulation method, performs a digital/digital conversion process for converting parts corresponding to the T.30 data included in the T.38 data into the G.711 data, not by using analog data, but by using the conversion table.

If the real-time communication method using the T.38 data after step S180 or in step S170 is supported, the CPU 22 transmits the fax data to the destination (step S190). Here, when transmitting the T.38 data, the IFP packet is transmitted from the I/F 27 to the destination set by the call set-up controller 35 as fax data at a communication speed that matches the receiving speed of the destination. Further, when transmitting the G.711 data, the IP packet including an IP header storing an address of the transmission origin and the destination, a UDP header storing a port number used for a transmission/reception, an RTP header storing an IP packet number, voice data to which a fax image is assigned (the part corresponding to the T.30 data) is transmitted from the I/F 27 at a transmission speed that matches a receiving speed of the destination as fax data. Subsequently, the CPU 22 determines whether the transmission of the fax data has been completed or not (step S200), continues a transmission process if the fax data transmission has not been completed, and if the fax data transmission has been completed, the CPU 22 releases the call set-up, and terminates this routine.

On the other hand, if the concurrent transmission mode is selected in step S140, the CPU 22 activates a fax transmission process in steps S150 to S200, to perform transmission to each destination (step S210) until all fax transmissions have been completed. Namely, the CPU 22 makes the T.38 data converter 33 and the G.711 D/D converter 34 generate the T.38 data or the G.711 data in accordance with respective communication methods of the plurality destinations that were input as the concurrent transmission, and performs a process of transmitting the generated digital data in parallel from the I/F 27 to each destination in a packet unit. In this case, the fax machine is configured such that the fax data transmission processes equivalent to the number of resources of the RAM 24 that may be secured are performed in parallel. When transmitting the fax data to the fax machine 50 supporting the T.38 data communication, or the fax machine 52 supporting G3, connected to the T.38 gateway 51, the CPU 22 transmits the T.38 data, when transmitting the fax data to the fax machine 54 supporting G3 that is connected to the VoIP gateway 53, the CPU 22 generates from the T.38 data, the G.711 data that matches a modulation method which the fax machine 54 supports, and transmits this generated G.711 data. In addition, the fax machine may be configured such that when transmitting the fax data to a fax machine that may receive the T.38 data and G.711 data (e.g., a machine having the same function as that of the fax machine 20), as the destination may perform a receiving, the T.38 data is generated and transmitted thereto at priority. By doing so, the possibility of reducing the time required for fax transmission may be increased. Further, when transmitting the fax data to a plurality of destinations and, for example, when there are a plurality of destinations that support the same communication method, the fax data may be transmitted to such destinations redundantly. Hence, the fax data is generated not using analog data, and transmitted to the destination. Thus the concurrent transmissions to a plurality of destinations may be executed concurrently in parallel without the need for the fax modem to convert analog data or without being constrained by one to one communication.

Figure 5:
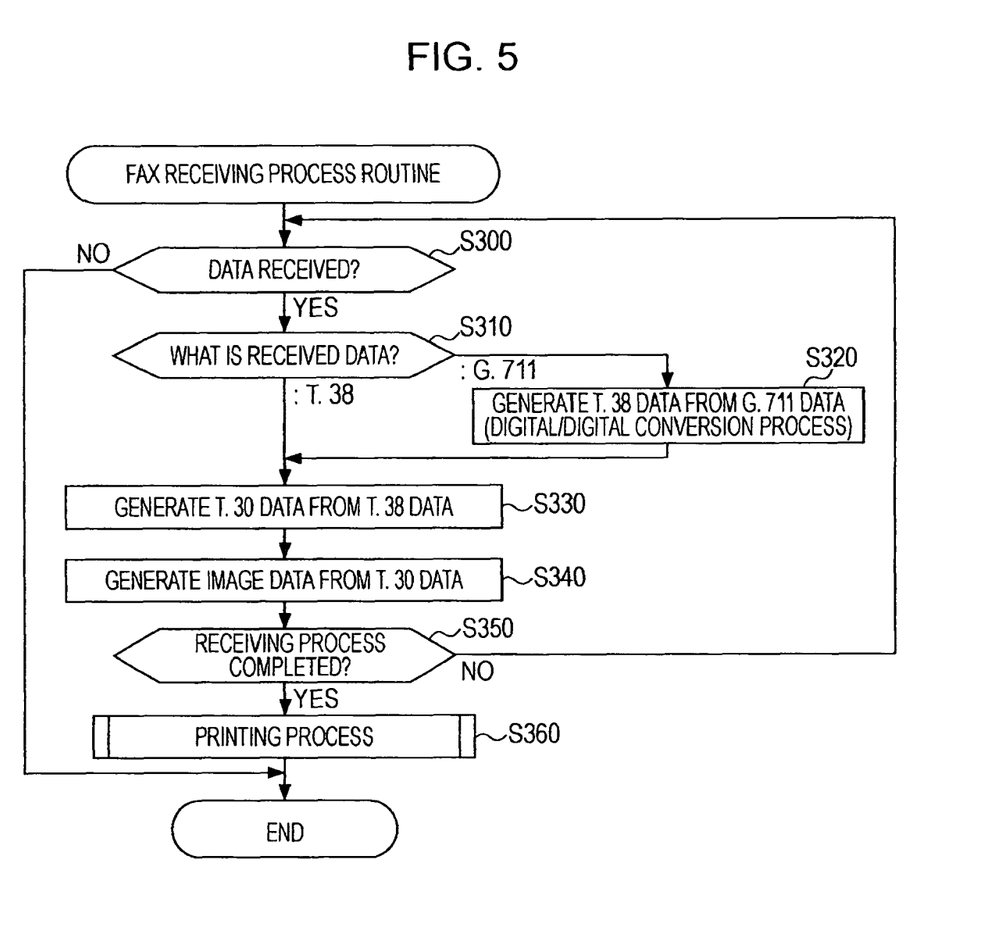
FIG. 5 is a flow chart showing an example of a fax receiving process routine.

Next, an operation of receiving the fax data will be explained. FIG. 5 is a flow chart showing an example of a fax receiving process routine performed by the CPU 22 of the fax machine 20. This routine is stored in the ROM 23 and executed repeatedly every predetermined timing (e.g., every several msec) after the fax machine 20 starts to operate. If this routine is executed, the CPU 22 firstly determines whether the fax data has been received or not (step S300), and terminates the routine if the fax data has not been received. The fax machine is configured such that, if receiving fax data, the call set-up controller 35 performs a connection process in accordance with a communication method which the transmission origin supports based on a request for connection from the transmission origin.

On the other hand, if the fax data has been received in step S300, the CPU 22 determines whether the received data is the T.38 data or the G.711 data (step S310). This may be determined based on the connection setting provided by the call set-up controller 35 or the header information of the received fax data, etc. If the received data is the G.711 data, the CPU 22 makes the G.711 D/D converter 34 convert the received G.711 data to the T.38 data (step S320). Here, the fax machine is configured that if the modulation method which the fax modem of the transmission origin supports is performed using the conversion data, the G.711 D/D converter 34 reads the conversion table corresponding to the modulation method, performs a digital/digital conversion process of parts corresponding to the T.30 data included in the T.711 data into the T.38 data, rather than analog data, using the conversion table.

The received data after step S320, or in step S310 is the T.38 data, the CPU 22 makes the T.38 data converter 33 generate the T.30 data from the T.38 data (step S330), and makes the T.30 image data converter 32 generate the image data from the generated T.30 data (step S340). Next, the CPU 22 determines whether the receiving process has been completed or not (step S350), and if the receiving process has not been completed, the CPU 22 continues the processes following step S300. Namely, the fax machine is configured such that, if the fax data has been received from a plurality of transmission origins, the CPU 22 performs the fax data receiving process in parallel similarly to a transmission process. In this case, the job controller 36 associates any data that is being received with information on the transmission origin to register it as fax data management information 24a. If the fax data receiving process has been completed in step S350, the CPU 22 activates and controls the printing mechanism 25 to perform a printing process (step S360), and terminates this routine. The printing process of forming an electrostatic latent image on an electrically charged photoconductor on the basis of image data and adding an electrically-charged toner by inducing the electrostatic latent image to form a toner image, superposing a toner image in each color via a transfer belt, transferring the superposed toner images on the paper, heating and applying pressure thereon together with transporting of the paper, and fixing the toner image on the paper surface, is performed by the printing mechanism 25. In addition, the fax machine is configured such that the printing mechanism 25 performs the printing process of the fax data in sequence starting from the fax data whose reception has been completed, if receiving a plurality of fax data have been received.

A corresponding relationship between elements of the present embodiment and elements of the present invention will be clarified hereafter. The reading mechanism 26 of the present embodiment corresponds to an image data generating unit of the present invention, and the I/F 27 corresponds to an information transmitting and receiving unit, the T.38 data corresponds to first digital data, the T.38 data converter 33 corresponds to a first data generating unit, T.711 data corresponds to second digital data, the G.711 D/D converter 34 corresponds to a second digital data generating unit, the CPU 22 corresponds to a control unit, and the operation panel 28 corresponds to a destination information input section. In addition, in the present embodiment, an example of a control method of a facsimile machine of the present invention explaining an operation of the fax machine is explained.

The fax machine 20 of the present embodiment as described above in detail generates the T.38 data based on the generated image data by reading the original, not through the analog data, and transmits the generated T.38 data to the destination, where the destination uses the real-time communication method, while generating the G.711 data based on the image data by reading the original, rather than analog data, and transmits the generated G.711 data to the destination, where the destination uses the deemed voice communication method. Generally, when transmitting and receiving data using the fax modem through the analog data, a maximum value of a transmission speed that may be adopted (e.g., 9.6 kbps) is determined, thus imposing many restrictions. In the present embodiment, however, as data is transmitted rather than analog data, the time required for transmission may be reduced more than that in the case of a method of transmitting data to the destination via the analog data. Further, when an instruction for performing concurrent transmissions by which transmissions to a plurality of destinations are performed has been input, the fax machine 20 makes the T.38 data converter 33 or the G.711 D/D converter 34 generate the fax data that matches respective communication methods of the input plurality of destinations, and transmit the generated fax data in parallel to the plurality of destinations. Generally, when transmitting the read image data as analog data and a plurality of destinations exist, the transmissions have to be performed in sequence. Thus, if non-receipt of the data by any of the destinations occurs, a transmission time to the subsequent destination may be delayed. However, in the present embodiment, by transmitting digital data to the destination rather than analog data, data transmissions may be performed in parallel, enabling more rapid data transmission to a plurality of destinations. Further, the G.711 D/D converter 34, when transmitting the fax data, performs a digital-to-digital conversion of the T.38 data to generate the G.711 data, thus transmitting data according to the real-time communication method with less restrictions for the transmission speed than the deemed voice communication method, thus reducing the time required for a transmission. Still further, since the received data converted to image data is not analog data, the time required for reception may be reduced more than in the case of converting received analog data to image data. In this case, the G.711 D/D converter 34, when receiving the fax data, performs digital-to-digital conversion of the G.711 data to generate the T.38 data, thus receiving data according to the real-time communication method with fewer restrictions for the transmission speed than the deemed voice communication method, thus reducing the time required for a reception. Besides, as the T.38 data converter 33 and the G.711 D/D converter 34 input/output the T.38 data into/from the T.30 image data converter 32, the T.38 data converter 33 and the G.711 D/D converter 34 may be easily installed on an existing fax machine that supports the T.38 communication method.

In addition, the present invention is not be limited to the above-described embodiment, but it goes without saying that the present invention may be carried out according to various embodiments as long as they belong to the technical scope of the present invention.

For example, in the above-described embodiment, although the fax machine is configured such that conversion of the image data (which also includes the T.30 data) and data according to the deemed voice communication method (G.711 data) is performed via the T.38 data converter 33 and the G.711 D/D converter 34, through the data of the real-time communication method (T.38 data), the image data and the data according to the deemed communication method may directly converted therebetween, not through the data of the real-time communication method. Alternatively, as for converting between the image data and the data according to the real-time communication method, the fax machine is configured such that conversion may be directly performed, but converting between the image data and the data according to the real-time communication method may be performed using the data according to the deemed voice communication method, namely, the fax machine may be configured such that a data conversion principally involving the deemed communication voice method is performed. Even if such a configuration is adopted, the time required for a transmission/reception may be reduced more.

In the above-described embodiment, the fax machine is configured such that the T.38 data is used as the digital data according to the real-time communication method, and the G.711 data is used as the digital data according to the deemed voice communication method, but any digital data according to the real-time communication method or any digital data according to the deemed voice communication method may be used.

In the above-described embodiment, the fax machine is configured such that the SIP server 40 as a telephone number control server is inquired about information on the destination, however the fax machine may be configured such that an H.323 server performing a connection control between terminals according to the H.323 protocol defined by ITU-T Recommendation is inquired about the information on the destination, alternatively, an ENUM server as a DNS server, managing ENUM (Telephone Number Mapping) information is inquired about the information on the destination. Even if such a configuration is adopted, it is possible to perform a call set-up process with the destination.

In the above-described embodiment, the fax machine is configured such that one of a normal transmission and a concurrent transmission may be selected as a transmission mode, however, in the above-described embodiment, the fax machine may be configured such that only the normal transmission may be selected. Further, the fax machine is configured such that the image data and the fax data are converted using the T.30 image data converter 32, the T.38 data converter 33 and the G.711 D/D converter 34, however the fax machine may be configured that the image data and the fax data are converted using one or more converters that is provided with these functions.

In the above-described embodiment, the fax machine is configured such that the fax machine 20 is not provided with a fax modem, however, the fax machine may be configured such that it can transmit/receive the fax data via a telephone line, assuming that it is provided with a fax modem, if the fax machine is configured such that when transmitting/receiving the fax information in an IP packet, fax information is transmitted/received not through the fax modem (analog data). Even if such a configuration is adopted, the time required for transmission/reception may be reduced more when transmitting/receiving the fax data in an IP packet.

In the above-described embodiment, the fax machine is configured such that the printing mechanism 25 is a full-color electrophotographic-type printer adopting a single-photoconductor method and an intermediate transfer method, however, ink jet method of applying pressure on ink in an ink cartridge using a piezoelectric element or a heater provided in a print head and discharging ink onto the paper S, may be adopted. Further, in the above-described embodiment, the reading mechanism 26 is configured as a flatbed type scanner that reads the original by scanning with a line image sensor, however, a scanner type that reads an image formed on the original by fixing the line image sensor and transporting the original, may be adopted.

The entire disclosure of Japanese Patent Application No. 2007-127796, filed May 14, 2007 is expressly incorporated by reference herein.

What is claimed is:

1. A facsimile machine comprising:
an image data generating unit that reads a original and generates image data which is digital data;
an information transmitting and receiving unit that transmits and receives the digital data;
a first data generating unit that generates first digital data, without using analog data, used for a real-time communication method implementing a data exchange in units of packets with a destination on the basis of the image data generated by the image data generating unit;
a second data generating unit that generates second digital data on the basis of the first digital data, without using analog data, used for a deemed voice communication method implementing a data exchange in units of packets with a destination; and
a control unit;
wherein the control unit makes the first data generating unit generate the first digital data, and the control unit subsequently determines whether the information transmitting and receiving unit receives information indicating that the destination uses the real-time communication method, uses the deemed voice communication method, or is capable of using either the real-time communication method or the deemed voice communication method;
wherein, when the information transmitting and receiving unit receives information indicating that the destination uses the real-time communication method, the control unit makes the information transmitting and receiving unit transmit the generated first digital data to the destination without generating the second digital data;
wherein, when the information transmitting and receiving unit receives information indicating that the destination uses the deemed voice communication method, the control unit makes the second data generating unit generate the second digital data from the first digital data, and makes the information transmitting and receiving unit transmit the generated second digital data to the destination; and
wherein, when the information transmitting and receiving unit receives the information indicating that the destination is capable of using either the real-time communication method or the deemed voice communication method, the control unit makes the information transmitting and receiving unit transmit the generated first digital data to the destination without generating the second digital data.

2. The facsimile machine according to claim 1, further comprising:
a destination information input section that input the destination, a communication methods of the destination, and a concurrent transmission instruction indicating that the image data generated by the image data generating section should be transmitted to a plurality of destinations in parallel;
wherein the control unit makes the first or second data generating section generate the first or second digital data according to the respective communication methods of the plurality of destinations, and makes the information transmitting and receiving section transmit the generated digital data to each of the input destinations in parallel when a concurrent transmission instruction has been input.

3. The facsimile machine according to claim 1,
wherein the second data generating section generates the second digital data by performing digital-to-digital conversion of the first digital data, and
the control unit makes the first data generating unit generate the first digital data and makes the second data generating unit generate the second digital data from the generated first digital data when the information transmitting and receiving unit receives the information indicating that the destination uses the deemed voice communication method.

4. The facsimile machine according to claim 1,
wherein the first digital generating unit generates a received image data from a received first digital data without using analog data, and the second data generating unit generates a received image data from a received second digital data without using analog data, wherein the control unit makes the first digital generating unit generate the received image data when the information transmitting and receiving unit receives the received first digital data from the destination, and makes the second data generating unit generate the received image data when the information transmitting and receiving unit receives the received second digital data from the destination.

5. The facsimile machine according to claim 3,
wherein the second data generating section generates the first digital data by performing digital-to-digital conversion of the second digital data, and the control unit makes the second data generating unit generate the first digital data from a received second digital data, and makes the first data generating unit generate the received image data from the generated first digital data when the received second digital data is received from the destination.

6. A method of controlling a facsimile machine having a first data generating section that generates first digital data used for a real-time communication method of executing data exchange with a destination in units of packets, on the basis of image data which is digital data generated by reading an original, without using analog data, and second data generating section that generates second digital data used for the deemed voice communication method of executing data exchange with a destination in units of packets, on the basis of the first digital data, without using analog data comprising:
 (a) making the first data generating section generate the first digital data;
 (b) subsequently determining whether the destination uses the real-time communication method, uses the deemed voice communication method, or is capable of using either the real-time communication method or the deemed voice communication method;
 (c) transmitting the generated first digital data to the destination when the destination uses the real-time communication method;
 (d) making the second data generating section generate the second digital data from the first digital data and transmitting the generated second digital data to the destination when the destination uses the deemed voice communication method; and
 (e) transmitting the generated first digital data to the destination without generating the second digital data when the destination can use either the real-time communication method or the deemed voice communication method.

* * * * *